G. C. WESTOVER.
Churn and Egg Beater.
No. 61,494. Patented Jan. 22, 1867
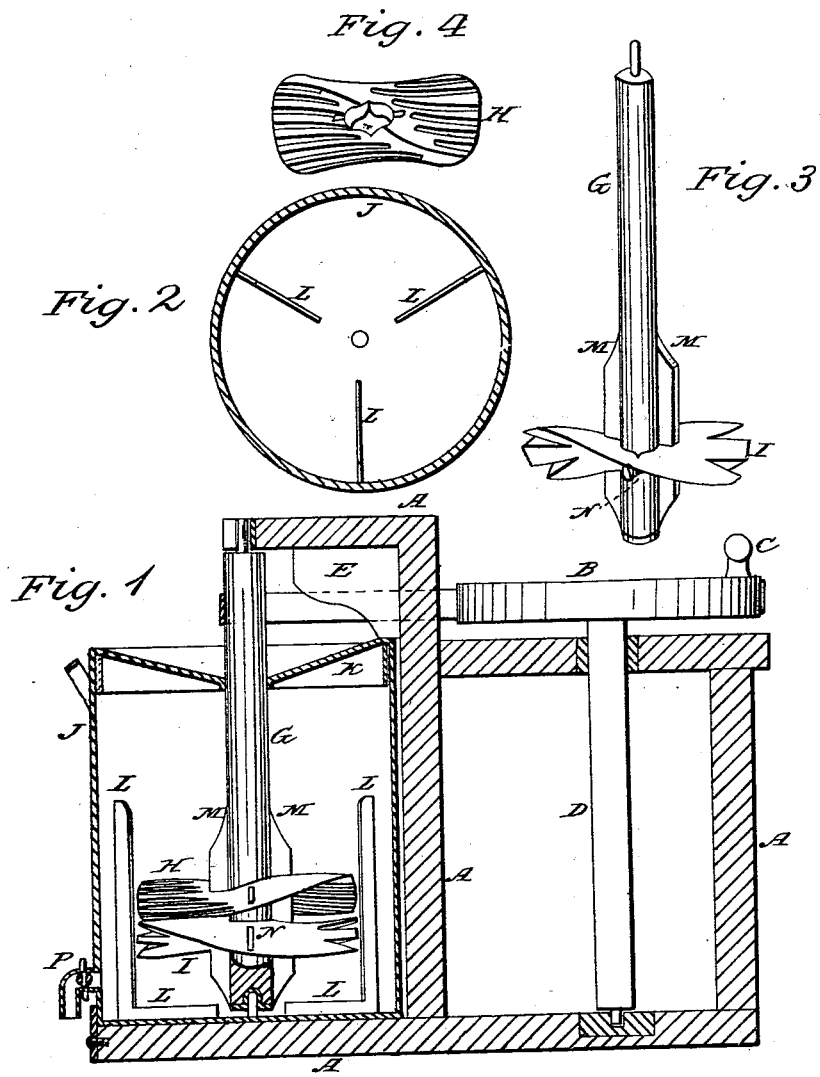

United States Patent Office.

GEORGE C. WESTOVER, OF PADUCAH, KENTUCKY.

Letters Patent No. 61,494, dated January 22, 1867.

IMPROVEMENT IN CHURN AND EGG-BEATER COMBINED.

The Schedule referred to in these Letters Patent and making part of the same.

TO ALL WHOM IT MAY CONCERN:

Be it known that I, GEORGE C. WESTOVER, of Paducah, McCracken county, State of Kentucky, have invented new and useful Improvements in Churns and Egg-Beater Combined; and I do hereby declare the following to be an exact description thereof, reference being had to the accompanying drawings, and to the letters of reference marked thereon, making a part of this specification, in which—

Figure 1 represents a sectional elevation of the whole churn.

Figure 2 a top view of the tin cylinder or churn with the three ribs or flanges on the inside.

Figure 3 a view of the shaft with the forked beater.

Figure 4 a view of the fluted beater.

The nature of my invention consists in the construction and combination of the churn with its devices, and operated by a reverse motion, both to expedite the churning and to collect the butter.

A represents the frame that supports the churn and its devices. B the band-wheel, (operated by a crank, C,) and revolving upon an upright shaft, D. The band E passes around the band-wheel B and the top of the shaft G that drives the shaft G, with its beaters, H I, in the churn J. The churn or cylinder J is made of tin or any suitable material, and has a concave lid, K, on its top, and three flanges, L, on its sides, at equal distances apart and extending along its bottom, but not connected at the centre of the bottom. On the shaft G are two blades, M, formed by a piece of wood or metal extending through the shaft G, to project on each side, and bevelled off at the top and bottom. The beaters H and I slip over the shaft G so as to fit closely upon the shaft and the flanges or blades M. The beaters H and I are intended to be used separately or together. They are curved diagonally or obliquely, the beater or dasher H being fluted, and the beater I being forked; and as the shaft G is revolved or receiving a reverse motion by the operation of the crank or handle C, the beaters H and I are braced and held firmly by the blades M, and operate accordingly, corresponding with the movement of the handle. A vacuum is formed below at the bottom of the blades M, and the notches or forks on the beater I allow the air to pass downward, and this beater I answers the purpose as an egg-beater, whilst the fluted beater H operates better upon cream or milk for churning butter. N is a thumb-screw to tighten the lower beater to the shaft G. P is a common faucet, for the purpose of drawing off the milk when desired, that may or may not be added.

What I claim as my invention, and desire to secure by Letters Patent, is—

The construction and combination of the churn, with its devices G H I J L M, as herein described and for the purposes set forth.

GEORGE C. WESTOVER.

Witnesses:
B. F. MOSES,
WM. J. GREIF.